(12) United States Patent
Mizobuchi et al.

(10) Patent No.: US 9,568,694 B2
(45) Date of Patent: Feb. 14, 2017

(54) OPTICAL MODULE

(71) Applicant: Hitachi Metals, Ltd., Tokyo (JP)

(72) Inventors: Kenji Mizobuchi, Hitachi (JP); Kenichi Tamura, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 15/074,812

(22) Filed: Mar. 18, 2016

(65) Prior Publication Data

US 2016/0291271 A1    Oct. 6, 2016

(30) Foreign Application Priority Data

Apr. 2, 2015    (JP) .................. 2015-076138

(51) Int. Cl.
 *G02B 6/42*    (2006.01)
 *G02B 6/43*    (2006.01)
(52) U.S. Cl.
 CPC ............ *G02B 6/4279* (2013.01); *G02B 6/428* (2013.01); *G02B 6/4274* (2013.01); *G02B 6/4281* (2013.01); *G02B 6/4284* (2013.01); *G02B 6/4295* (2013.01)
(58) Field of Classification Search
 CPC ..... G02B 6/4274; G02B 6/4279; G02B 6/428; G02B 6/4281; G02B 6/4284; G02B 6/4295
 See application file for complete search history.

(56) References Cited

U.S. PATENT DOCUMENTS

| | | | |
|---|---|---|---|
| 9,363,021 B2* | 6/2016 | Fujimura | ................... G01J 1/44 |
| 2013/0001410 A1* | 1/2013 | Zhao | ..................... H05K 1/0298 |
| | | | 250/227.11 |
| 2014/0140665 A1 | 5/2014 | Akashi et al. | |
| 2016/0170145 A1* | 6/2016 | Kawamura | .......... G02B 6/4261 |
| | | | 250/226 |

FOREIGN PATENT DOCUMENTS

JP       2014-103138 A    6/2014
WO    WO 2012100209 A2 *  7/2012   ........... G02B 6/4215

* cited by examiner

*Primary Examiner* — Michelle R Connelly
(74) *Attorney, Agent, or Firm* — McGinn IP Law Group, PLLC (57) ABSTRACT

An optical module includes a first circuit board, an optical sub-assembly, a first flexible printed circuit and a second flexible printed circuit. At first electrical connection terminals and a first electrical connector are provided on the first circuit board. The optical sub-assembly includes a second circuit board that includes second electrical connection terminals and a second electrical connector. The first flexible printed circuit is connected to the first electrical connection terminals and the second electrical connection terminals. The second flexible printed circuit is connected to the first and second electrical connectors. A high-speed electrical signal of 1 GHz or higher is transmitted between both the circuit boards through the first flexible printed circuit, and a power source signal and a low-speed electrical signal of 1 MHz or lower are transmitted between both the circuit boards through the second flexible printed circuit.

3 Claims, 6 Drawing Sheets

OPTICAL MODULE

The present application is based on Japanese patent application No. 2015-076138 filed on Apr. 2, 2015, the entire contents of which are incorporated herein by reference.

BACKGROUND OF THE INVENTION

1. Field of the Invention

The present invention relates to an optical module.

2. Description of the Related Art

There are known related-art optical modules in which an optical sub-assembly such as a transmitter optical sub-assembly (TOSA) or a receiver optical sub-assembly (ROSA) is housed in a casing. There also are known optical modules that can perform transmission and reception by housing the TOSA, which is an optical sub-assembly for transmission, and the ROSA, which is an optical sub-assembly for reception, in a common casing (see, for example, Japanese Unexamined Patent Application Publication No. 2014-103138).

In many cases, optical modules using optical sub-assemblies include a circuit board on which connection terminals for connection with a communication device, a microcontroller that performs control and the like on the optical sub-assemblies, a power source circuit, and so forth are mounted. This circuit board and a circuit board provided in the optical sub-assembly are electrically connected through a flexible printed circuit (FPC).

SUMMARY OF THE INVENTION

Recently, an optical transmission system has been developed which supports a transmission speed of 100 Gb/s (gigabits per second) by multiplexing four optical signals of different wavelengths each transmitted at an information transmission speed of 25 Gb/s.

In an optical module that supports such high-speed transmission of 100 Gb/s, high-speed electrical signals of 25 Gb/s are transmitted. Thus, it is not preferable to use an electrical connector such as an FPC connector that may cause significant losses and crosstalk in a connection portion between the FPC and the circuit board. Instead, it is preferable to directly connect the FPC to the circuit board by soldering.

However, when the FPC and the circuit board are directly soldered to each other, a following problem arises.

Manufacture of an optical module typically involves checking for the optical sub-assembly and alignment work for an optical system. When a problem arises in this checking or alignment work for the optical sub-assembly, it is required that the optical sub-assembly be replaced or the optical sub-assembly be detached so as to perform work such as replacement of an element of the optical sub-assembly. However, when the FPC and the circuit board are directly soldered to each other, detachment of the optical sub-assembly may be difficult.

That is, when the FPC and the circuit board are directly soldered to each other so as to support high-speed transmission, there is a problem in that an assembly process including the check and the alignment work is not easily performed.

Accordingly, an object of the present invention is to provide an optical module that is easily assembled and suitable for high-speed transmission.

In order to address the above-described task, an optical module provided according to an aspect of the present invention includes a first circuit board, at least one first electrical connection terminal, a first electrical connector, an optical sub-assembly, at least one second electrical connection terminal, a second electrical connector, a first flexible printed circuit, and a second flexible printed circuit. The first circuit board is electrically connected to a communication device. The at least one first electrical connection terminal is formed on a front surface of the first circuit board at one end portion of the first circuit board. The first electrical connector is mounted on a rear surface of the first circuit board at the one end portion of the first circuit board. The optical sub-assembly includes a housing and a second circuit board. An optical system and an optical element for transmission of an optical signal, an optical system and an optical element for reception of an optical signal, or the optical system and the optical element for the transmission of the optical signal and the optical system and the optical element for the reception of the optical signal are housed in the housing. The second circuit board has one end portion inserted into the housing and another end portion disposed outside the housing. The at least one second electrical connection terminal is formed on a front surface of the second circuit board at the other end portion of the second circuit board. The second electrical connector is formed on a rear surface of the second circuit board at the other end portion of the second circuit board. The first flexible printed circuit includes at least one third electrical connection terminal, at least one fourth electrical connection terminal, and at least one impedance line for high-speed transmission. The at least one third electrical connection terminal is connected to the at least one first electrical connection terminal by soldering. The at least one fourth electrical connection terminal is connected to the at least one second electrical connection terminal by soldering. The at least one third electrical connection terminal and the at least one fourth electrical connection terminal are electrically connected to each other through the at least one impedance line for high-speed transmission. The second flexible printed circuit includes a third electrical connector, a fourth electrical connector, and transmission lines. The third electrical connector is connected to the first electrical connector. The fourth electrical connector is connected to the second electrical connector. The third electrical connector and the fourth electrical connector are electrically connected to each other through the transmission lines. In the optical module, a high-speed electrical signal of 1 GHz or higher is transmitted between the first circuit board and the second circuit board through the first flexible printed circuit, and a power source signal and a low-speed electrical signal of 1 MHz or lower including a direct-current signal are transmitted between the first circuit board and the second circuit board through the second flexible printed circuit.

According to the present invention, the optical module that is easily assembled and suitable for high-speed transmission can be provided.

BRIEF DESCRIPTION OF THE DRAWINGS

FIGS. 3A and 3B illustrate a transmitter and receiver integrated optical sub-assembly used for the optical module according to the embodiment of the present invention, and, out of FIGS. 3A and 3B.

DESCRIPTION OF THE PREFERRED EMBODIMENTS

Embodiment

An embodiment of the present invention will be described below with reference to the accompanying drawings.

Figure 1A:
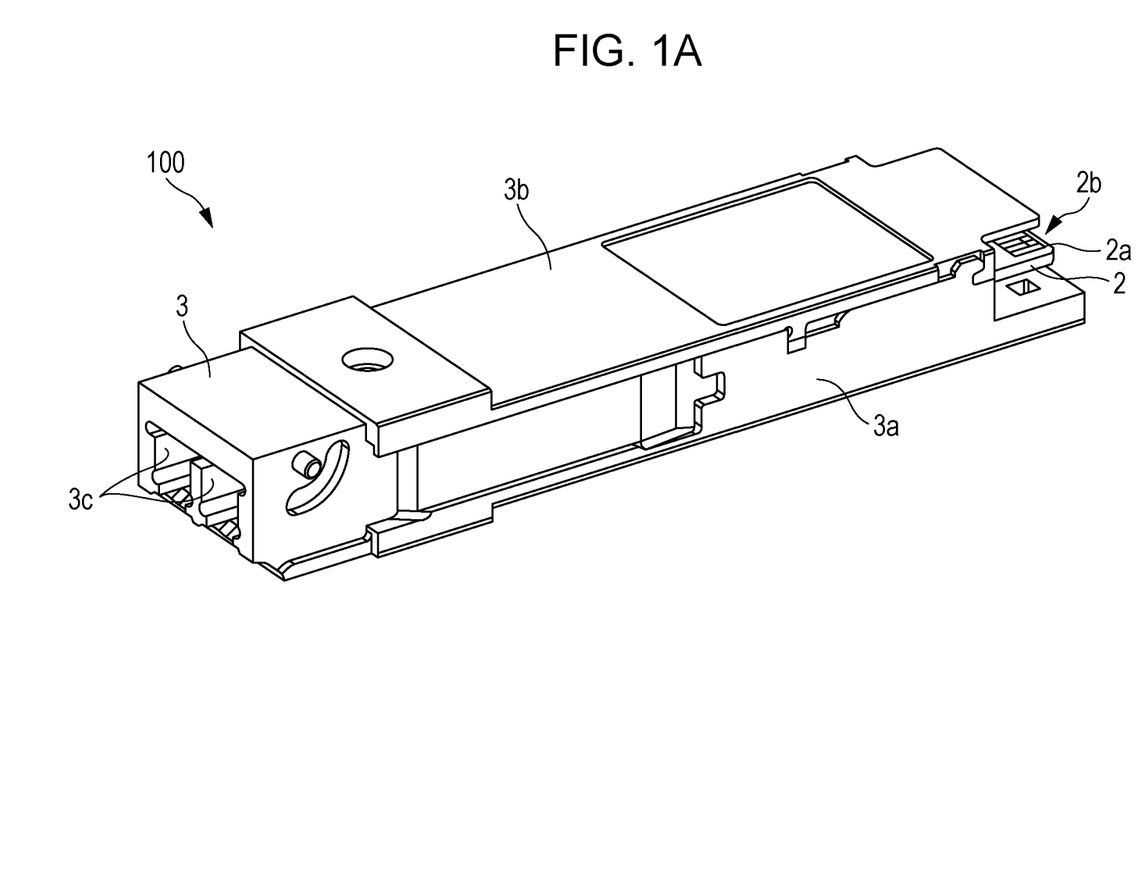
FIG. 1A is a perspective external view of an optical module according to an embodiment of the present invention.
Figure 1B:
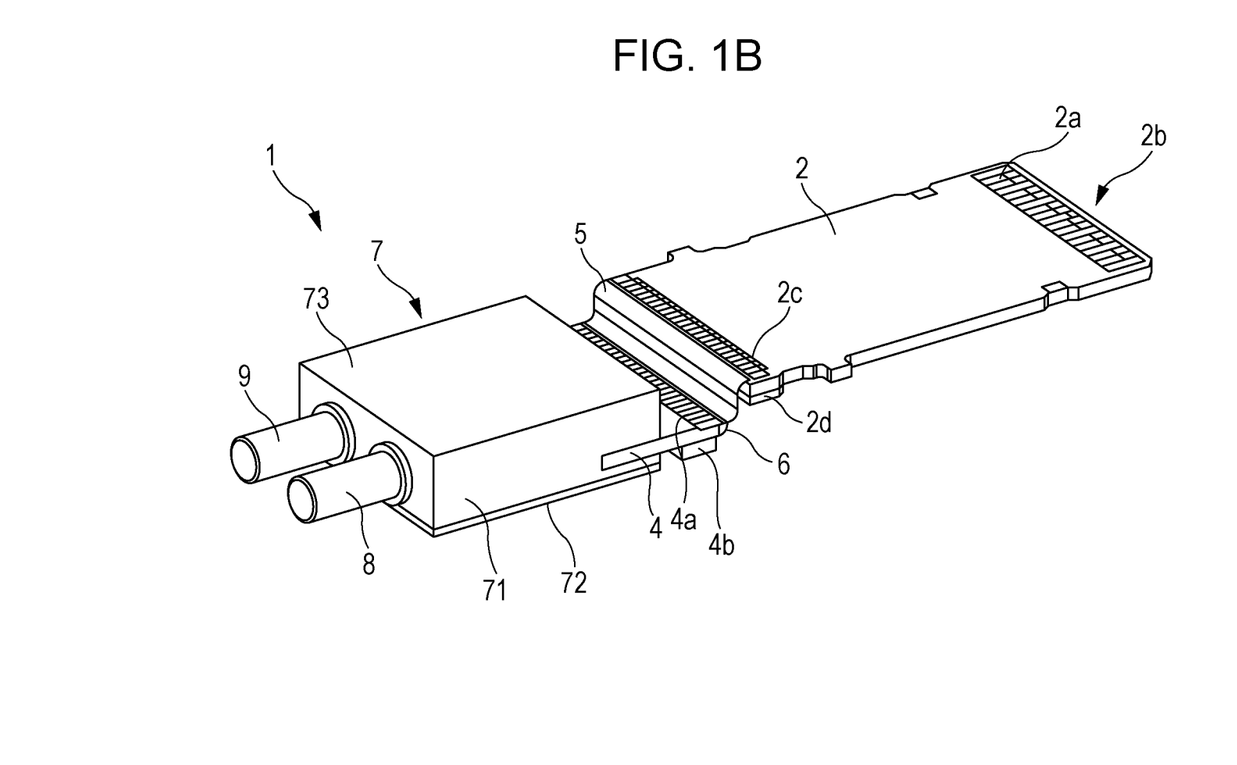
FIG. 1B is a perspective view of the optical module according to the embodiment of the present invention with a module casing omitted.

FIG. 1A is a perspective external view of an optical module according to an embodiment of the present invention. FIG. 1B is a perspective view of the optical module according to the embodiment of the present invention with a casing of the optical module omitted.

As illustrated in FIGS. 1A and 1B, an optical module 100 includes a transmitter and receiver integrated optical sub-assembly 1 serving as an optical sub-assembly, a first circuit board 2, and a casing 3 that houses the transmitter and receiver integrated optical sub-assembly 1 and the first circuit board 2.

The casing 3 includes a main body 3a that houses the transmitter and receiver integrated optical sub-assembly 1 and the first circuit board 2. The casing 3 also includes a lid 3b that closes an opening (not illustrated) of the main body 3a. Two insertion holes 3c are formed at a distal end portion (end portion on the left front side of FIG. 1A) of the main body 3a. Optical plugs (not illustrated) provided at end portions of transmission and reception optical fibers are inserted into the insertion holes 3c. Furthermore, an opening is formed at a proximal end portion (end portion on the right rear side of FIG. 1A) of the main body 3a. An end portion of the first circuit board 2 is exposed from this opening.

Electrodes 2a for connection to a communication device (not illustrated) are arranged at the end portion of the first circuit board 2 (end portion on an opposite side to the transmitter and receiver integrated optical sub-assembly 1) exposed from the main body 3a. Thus, a card edge connector 2b is formed. The optical module 100 converts electrical signals received from the communication device through the card edge connector 2b into optical signals and transmits the resulting optical signals to the transmission optical fiber. Also, the optical module 100 converts the optical signals received from the reception optical fiber into electrical signals and outputs the resulting electrical signals to the communication device through the card edge connector 2b.

Although it is not illustrated, the first circuit board 2 includes a clock data recovery (CDR) circuit, a power supply circuit, a microcontroller, and so forth. The CDR shapes waveforms of the electrical signals output from the transmitter and receiver integrated optical sub-assembly 1, and the microcontroller controls the entirety of the optical module 100 including the transmitter and receiver integrated optical sub-assembly 1.

The transmitter and receiver integrated optical sub-assembly 1 includes a housing 7 and a second circuit board 4. The housing 7 houses an optical system and optical elements for transmission of the optical signals, an optical system and optical elements for reception of the optical signals, or both the former and the latter. The second circuit board 4 has one end portion inserted into the housing 7 and another end disposed outside the housing 7. Although the transmitter and receiver integrated optical sub-assembly 1 that can transmit and receive the optical signals is used according to the present embodiment, an optical sub-assembly that can only transmit or receive the optical signals may be used. A specific structure of the transmitter and receiver integrated optical sub-assembly 1 will be described later.

The optical module 100 multiplexes, for example, four optical signals of different wavelengths each transmitted at an information transmission speed of 25 Gb/s into one signal so as to transmit the signal and receives and demultiplexes such a multiplexed signal, thereby supporting a transmission speed of 100 Gb/s.

Next, connection between the first circuit board 2 and the transmitter and receiver integrated optical sub-assembly 1 is described.

Figure 2:
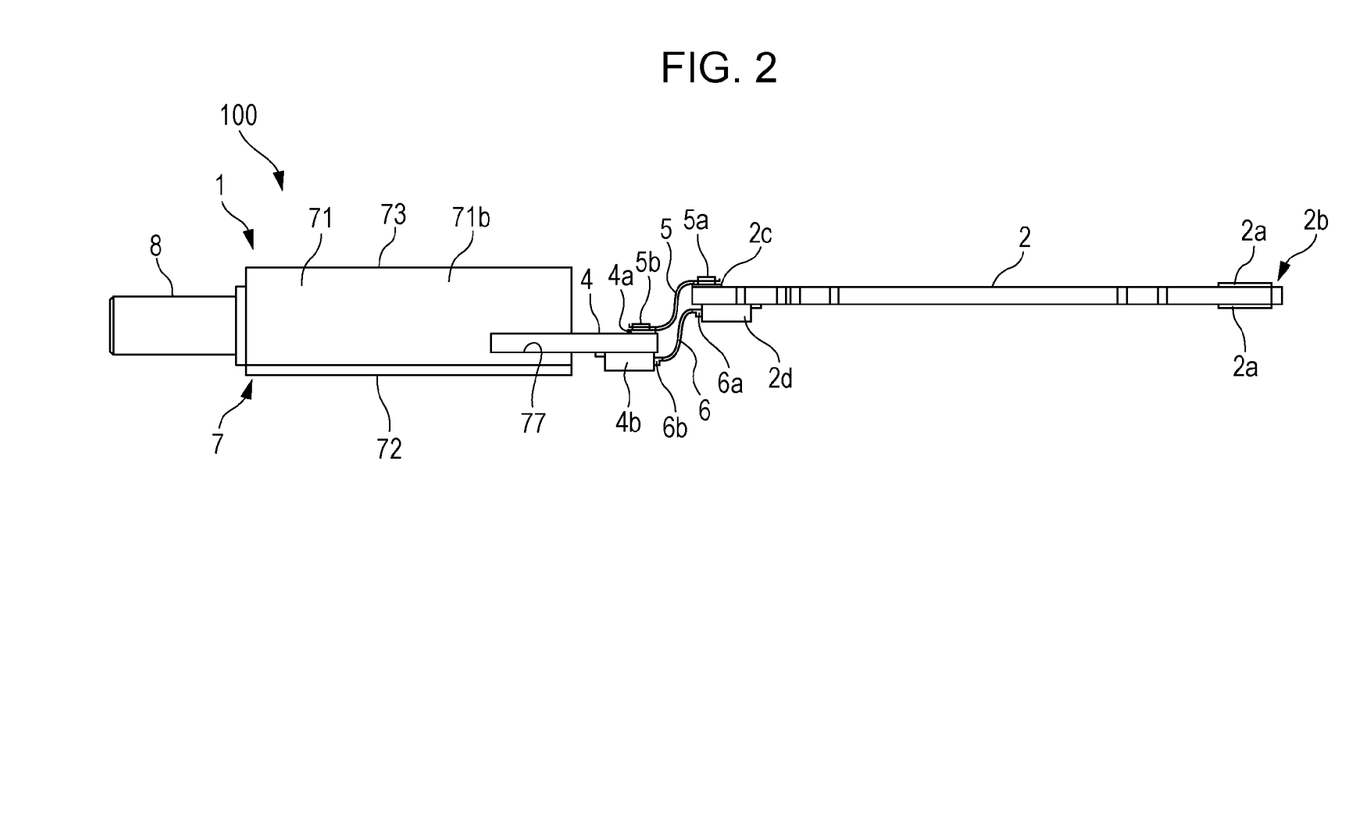
FIG. 2 is a side view of the optical module of FIG. 1B.

As illustrated in FIGS. 1B and 2, the first circuit board 2 and the second circuit board 4, which is included in the transmitter and receiver integrated optical sub-assembly 1, are connected to each other through two flexible printed circuits (FPCs) 5 and 6. The first circuit board 2 and the second circuit board 4 each include, for example, a ceramic multilayer board.

First electrical connection terminals 2c are formed on a front surface of the first circuit board 2 at one end portion (end portion on the transmitter and receiver integrated optical sub-assembly 1 side) of the first circuit board 2. The first electrical connection terminals 2c are used for connection with the second circuit board 4. Furthermore, a first electrical connector 2d is mounted on a rear surface of the first circuit board 2 at the one end portion of the first circuit board 2. The first electrical connector 2d is used for the connection with the second circuit board 4. The first electrical connection terminals 2c include a plurality of electrodes (pads) formed along one end of the first circuit board 2. The first electrical connector 2d includes an FPC connector.

Second electrical connection terminals 4a are formed on the front surface of the second circuit board 4 at another end portion of the second circuit board 4. The second electrical connection terminals 4a are used for connection with the first circuit board 2. A second electrical connector 4b is mounted on a rear surface of the second circuit board 4 at the other end portion of the second circuit board 4. The second electrical connector 4b is used for the connection with the first circuit board 2. The second electrical connection terminals 4a include a plurality of electrodes (pads) formed along the other end of the second circuit board 4. The second electrical connector 4b includes an FPC connector.

The first FPC 5 includes third electrical connection terminals 5a connected to the first electrical connection terminals 2c of the first circuit board 2 by soldering, fourth electrical connection terminals 5b connected to the second electrical connection terminals 4a of the second circuit board 4 by soldering, and impedance lines for high-speed transmission (not illustrated) through which the third electrical connection terminals 5a and the fourth electrical connection terminals 5b are electrically connected to one another.

As the impedance lines for high-speed transmission, microstrip lines, grounded coplanar lines, or strip lines can be used. When the impedance lines include microstrip lines or strip lines, a multilayer board may be used as the first FPC 5.

According to the present embodiment, high-speed electrical signals of 1 GHz or higher is transmitted between both the circuit boards 2 and 4 through this first FPC 5. The first FPC 5 is directly connected to both the circuit boards 2 and 4 by soldering and provided with the impedance lines for high-speed transmission. Thus, the first FPC 5 has a structure suitable for high-speed transmission.

The second FPC 6 includes a third electrical connector 6a connected to the first electrical connector 2d of the first circuit board 2, a fourth electrical connector 6b connected to the second electrical connector 4b of the second circuit board 4, and transmission lines (not illustrated) through which the third electrical connector 6a and the fourth electrical connector 6b are connected to each other.

According to the present embodiment, low-speed electrical signals of 1 MHz or lower including direct-current signals and power source signals are transmitted between both the circuit boards 2 and 4 through this second FPC 6. Although the second FPC 6, which is connected to both the circuit boards 2 and 4 through the connectors, is not suitable for high-speed transmission, the low-speed signals and the power source signals can be transmitted through the second FPC 6 without a problem. Furthermore, the second FPC 6, which is connected to both the circuit boards 2 and 4 through the connectors, can be easily attached and detached.

As has been described, according to the present embodiment, the first FPC 5 connected to both the circuit boards 2 and 4 by soldering is used for high-speed transmission, and a second FPC 6 connected to both the circuit boards 2 and 4 through the connectors is used for transmission of the low-speed signals and the power source signals.

Next, the transmitter and receiver integrated optical sub-assembly 1 is described.

Figure 3A:
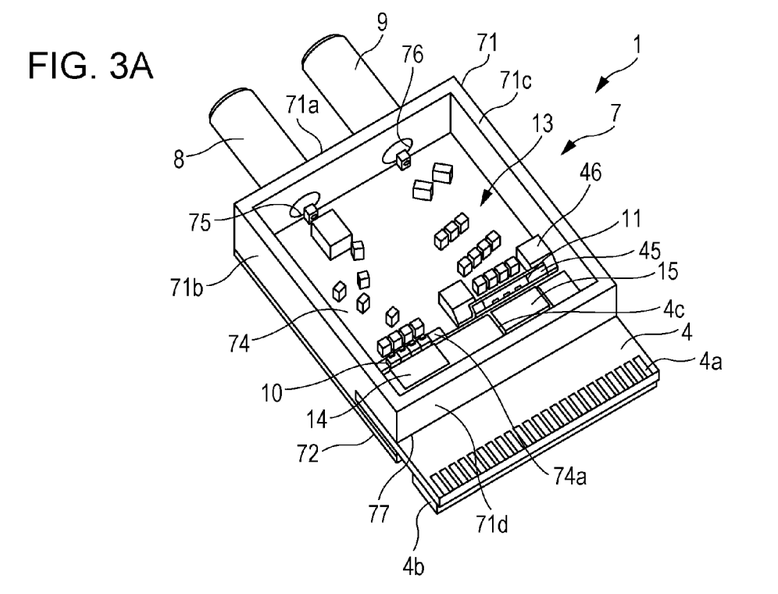
FIG. 3A is a perspective view of the transmitter and receiver integrated optical sub-assembly.
Figure 3B:
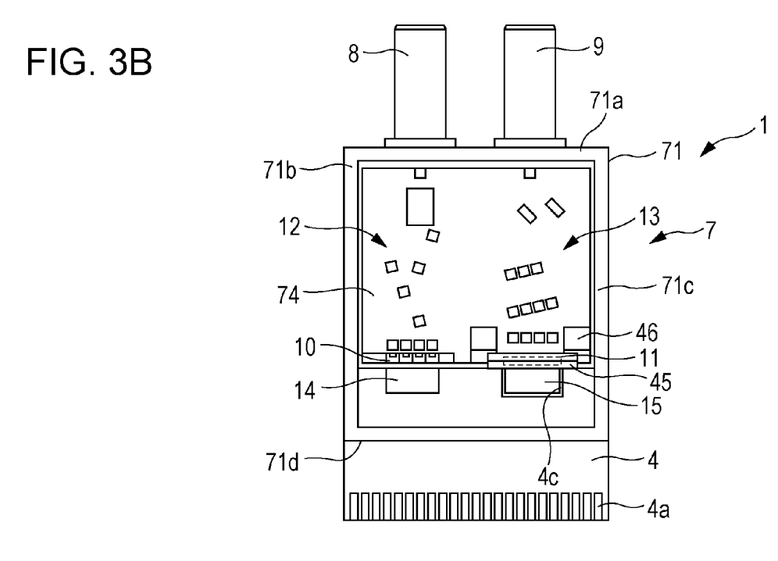
FIG. 3B is a plan view of the transmitter and receiver integrated optical sub-assembly.

FIGS. 3A and 3B illustrate the transmitter and receiver integrated optical sub-assembly 1, and out of FIGS. 3A and 3B, FIG. 3A is a perspective view of the transmitter and receiver integrated optical sub-assembly 1, and FIG. 3B is a plan view of the transmitter and receiver integrated optical sub-assembly 1.

As illustrated in FIGS. 3A and 3B, the transmitter and receiver integrated optical sub-assembly 1 includes the housing 7, a transmitter-side optical receptacle 8, a receiver-side optical receptacle 9, the second circuit board 4, a plurality of laser diodes (LDs) 10, a plurality of photo diodes (PDs) 11, a transmitter-side optical system 12, a receiver-side optical system 13, a driver integrated circuit (IC) 14, and a transimpedance amplifier (TIA) 15. Each of the LDs 10 serves as a light emitting element, each of the PDs 11 serves as a light receiving element, and the TIA 15 serves as an amplifying integrated circuit (IC).

The housing 7 includes a box-shaped side wall structure 71 having openings at its top and bottom in a height direction, a bottom wall 72 that closes the opening at the bottom of the side wall structure 71, and a top wall 73 (see FIG. 1B) that closes the opening at the top of the side wall structure 71. The top wall 73 is omitted from FIGS. 3A and 3B. Hereafter, an up-down direction of FIG. 3B (direction perpendicular to the height direction) is referred to as a length direction, and a left-right direction of FIG. 3B (direction perpendicular to the height direction and the length direction) is referred to as a width direction.

According to the present embodiment, the housing 7 has a rectangular parallelepiped shape. The side wall structure 71 having a rectangular shape in top view includes a first side wall 71a disposed in the width direction, a second side wall 71b and a third side wall 71c that extend in the length direction from respective end portions of the first side wall 71a in the width direction, and a fourth side wall 71d that is disposed in the width direction and connects an opposite end portion of the second side wall 71b to the first side wall 71a to an opposite end portion of the third side wall 71c to the first side wall 71a.

The housing 7 is preferably formed of a material having a high thermal conductivity from the view point of improvement of a heat dissipation capability. Although the housing 7 is formed of metal, and more specifically, a gold-plated Kovar (trademark) material according to the present embodiment, the housing 7 may be formed of resin. The side wall structure 71 is hermetically connected to the bottom wall 72 and the top wall 73 by, for example, welding or bonding.

Two through holes 75 and 76 are formed on the one side of the side wall structure 71 in the length direction, that is, in the first side wall 71a. The through holes 75 and 76 are spaced from each other in the width direction and penetrate through the first side wall 71a. The transmitter-side optical receptacle 8 is attached to the through hole 75, which is one of the two through holes 75 and 76, and the receiver-side optical receptacle 9 is attached to another through hole 76. The optical plug for transmission, which is inserted through one of the insertion holes 3c of the casing 3, is connected to the transmitter-side optical receptacle 8. The optical plug for reception, which is inserted through the other insertion hole 3c of the casing 3, is connected to the receiver-side optical receptacle 9.

A through hole for a board 77 is formed on the other side of the side wall structure 71 in the length direction, that is, in the fourth side wall 71d. The second circuit board 4 is inserted through the through hole for a board 77. Here, parts of the through hole for a board 77 extend from the fourth side wall 71d to the second and third side walls 71b and 71c.

The one end portion of the second circuit board 4 is inserted into the housing 7 through the through hole for a board 77, and the other end portion of the second circuit board 4 is disposed outside the housing 7. The second circuit board 4 is secured to the housing 7 by brazing using, for example, a silver solder. The width of the second circuit board 4 is substantially the same as that of the housing 7. Both end portions of the second circuit board 4 in the width direction are supported by the second and third side walls 71b and 71c.

The second electrical connection terminals 4a are electrically connected to the driver IC 14 and the TIA 15 through a wiring pattern (not illustrated) formed on the second circuit board 4 and the second electrical connector 4b formed at the other end portion of the second circuit board 4 is electrically connected to the driver IC 14 and the TIA 15 through the wiring pattern formed on the second circuit board 4. When forming the wiring pattern on the front surface or the rear surface of the second circuit board 4, an insulating body such as ceramic may be interposed between the second circuit board 4 and the housing 7 so that the wiring pattern and the housing 7 are not in contact with each other.

According to the present embodiment, a metal plate 74 secured to the bottom wall 72 is further provided. The plurality of LDs 10, the plurality of PDs 11, the transmitter-side optical system 12, and the receiver-side optical system 13 are mounted on the metal plate 74. The metal plate 74 is used to align the position of the transmitter-side optical system 12 with the position of the transmitter-side optical receptacle 8 in the height direction and the position of the receiver-side optical system 13 with the position of receiver-side optical receptacle 9 in the height direction. The metal plate 74 is also used to improve the heat dissipation capability. The metal plate 74 is preferably formed of a material that has a coefficient of linear expansion substantially equal to those of semiconductors included in the LDs 10 and PDs 11 and members such as glass included in the transmitter-side optical system 12 and the receiver-side optical system 13. For example, it is preferable that the metal plate 74 be formed of a Kovar material. It is also possible that the metal plate 74 is omitted and the thickness of the bottom wall 72 is increased instead. The metal plate 74 is secured to the bottom wall 72 by using, for example, a tin silver solder.

The plurality of LDs 10 are directly mounted on the metal plate 74, which is secured to the bottom wall 72, and arranged in a row in the width direction. Here, a case where four LDs 10 are provided is described. The light emission wavelengths of the four LDs 10 are different from one another. The driver IC 14 that drives the LDs 10 is disposed between the four LDs 10 and the fourth side wall 71d.

Figure 4A:
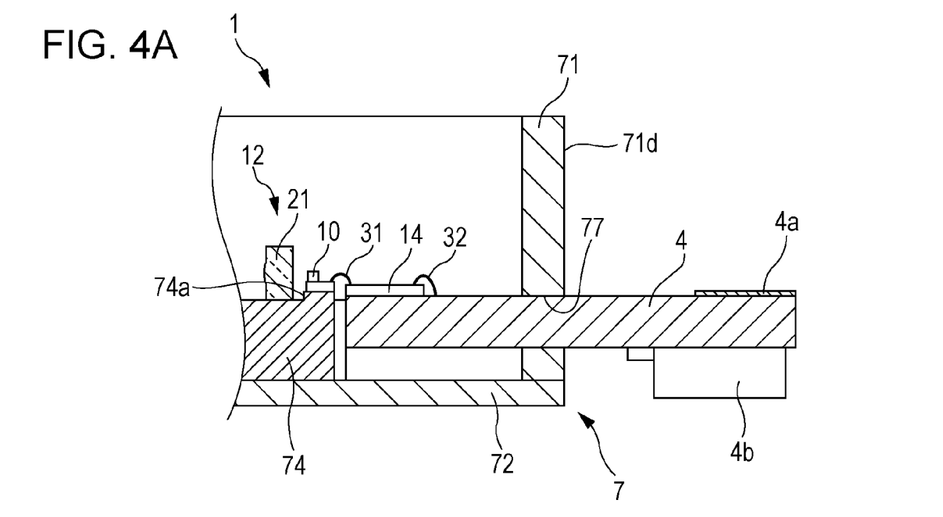
FIG. 4A is an enlarged sectional view of a main portion of the transmitter and receiver integrated optical sub-assembly of FIGS. 3A and 3B.

As illustrated in FIG. 4A, the LDs 10 are mounted on the metal plate 74 and the driver IC 14 is mounted on the circuit board 4 inserted into the housing 7 according to the present embodiment. With this structure, heat generated in the driver IC 14 is unlikely to be transmitted to the LDs 10. This can suppress the occurrences of problems such as reduction in luminous efficiency of the LDs 10 due to transmission of the heat generated in the driver IC 14 to the LDs 10.

The LDs 10 and the driver IC 14 are electrically connected to one another through wiring 31. The driver IC 14 and the wiring pattern of the second circuit board 4 are electrically connected to each other through wiring 32. Here, a projection 74a that projects upward is formed at an end portion of the metal plate 74 on the second circuit board 4 side. The LDs 10 are mounted on this projection 74a so that the optical axes of the LDs 10 are coincident with the respective optical axes of collimating lenses 21 of the transmitter-side optical system 12.

From the viewpoint of reducing the likelihood of the heat generated in the driver IC 14 being transmitted to the LDs 10, the metal plate 74 and the second circuit board 4 are preferably separated from each other so as to thermally insulate the metal plate 74 and the second circuit board 4 from each other. Furthermore, when ground wiring is routed to the end portion of the second circuit board 4, the ground wiring and the metal plate 74 are electrically connected to each other through contact between the second circuit board 4 and the metal plate 74. In this case, the metal plate 74 and the second circuit board 4 are preferably separated from each other from the viewpoint of separation of a signal ground and a case ground. However, when the distance between the metal plate 74 and the second circuit board 4 is excessively increased, the length of the wiring (wiring 31) between the driver IC 14 and the LDs 10 is increased. This causes degradation of the high-speed signals. Thus, from the viewpoint of suppressing the degradation of the high-speed signals, it can be said that the metal plate 74 and the second circuit board 4 are preferably disposed close to each other as much as possible. With the above-described viewpoints taken into consideration, according to the present embodiment, the metal plate 74 and the second circuit board 4 are separated from each other by a distance of about 0.1 to 0.2 mm.

The transmitter-side optical system 12 is disposed between the transmitter-side optical receptacle 8 and four LDs 10 on the bottom wall 72 (here, on the metal plate 74) and combines optical signals incident thereupon from four LDs 10 so as to output a resulting optical signal to the transmitter-side optical receptacle 8.

Figure 4B:
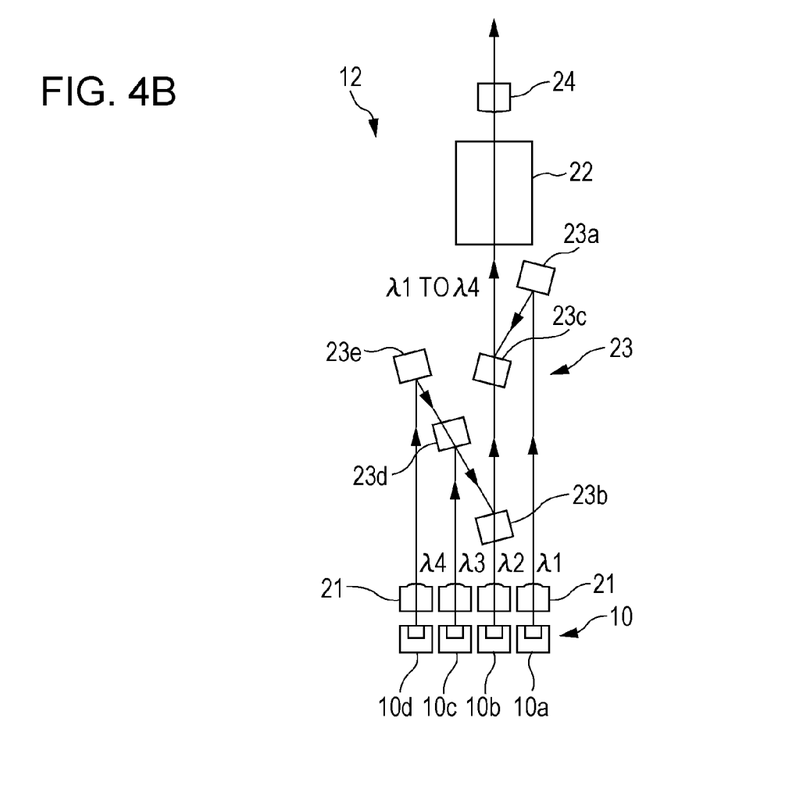
FIG. 4B illustrates the structure of a transmitter-side optical system.

As illustrated in FIG. 4B, the transmitter-side optical system 12 includes four collimating lenses 21, an optical isolator 22, five mirrors (filters) 23, and an output-side lens 24. The collimating lenses 21 collimate light incident thereupon from the LDs 10. The mirrors convert the optical paths of beams of the light having been output from the LDs 10 and passed through the collimating lenses 21 so as to guide the light to the optical isolator 22. The output-side lens 24 condenses the light having passed through the optical isolator 22 so as to output the light to the transmitter-side optical receptacle 8. The optical isolator 22 transmits only light traveling in a forward direction and blocks light traveling in the opposite direction. Here, the optical isolator 22 transmits only the light traveling from the LD 10 side to the transmitter-side optical receptacle 8 side.

Four collimating lenses 21 are each disposed at a position facing a light emitting portion of a corresponding one of the LDs 10. The distance between each of the collimating lenses 21 and a corresponding one of the LDs 10 is equal to the focal length of the collimating lens 21. Hereafter, it is assumed that first to fourth LDs 10a to 10d are arranged from the right to left of FIG. 3B and the light emission wavelengths of the first to fourth LDs 10a to 10d are respectively $\lambda 1$ to $\lambda 4$.

The five mirrors 23 include the following first to fifth mirrors 23a to 23e: the first mirror 23a that reflects a beam of the light having a wavelength of $\lambda 1$; the second mirror 23b that transmits a beam of the light having a wavelength of $\lambda 2$ and reflects beams of the light having wavelengths of $\lambda 3$ and $\lambda 4$; the third mirror 23c that transmits the beams having wavelengths of $\lambda 2$, $\lambda 3$, and $\lambda 4$ and reflects the beam having wavelength of $\lambda 1$; the fourth mirror 23d that transmits the beam having a wavelength of $\lambda 4$ and reflects the beam having a wavelength of $\lambda 3$; and the fifth mirror 23e that reflects the beam having a wavelength of $\lambda 4$.

The first mirror 23a reflects the beam having a wavelength of $\lambda 1$ having been output from the first LD 10a and passed through a corresponding one of the collimating lenses 21 so as to guide the beam having a wavelength of $\lambda 1$ to the third mirror 23c. The second mirror 23b reflects the beam having a wavelength of $\lambda 3$ incident thereupon from the fourth mirror 23d and the beam having a wavelength of $\lambda 4$ incident thereupon from the fifth mirror 23e so as to guide the beam having a wavelength of $\lambda 3$ and the beam having a wavelength of $\lambda 4$ to the optical isolator 22. The third mirror 23c reflects the beam having a wavelength of $\lambda 1$ incident thereupon from the first mirror 23a so as to guide the beam having a wavelength of $\lambda 1$ to the optical isolator 22. The fourth mirror 23d reflects the beam having a wavelength of $\lambda 3$ having been output from the third LD 10c and passed through a corresponding one of the collimating lenses 21 so as to guide the beam having a wavelength of $\lambda 3$ to the second mirror 23b. The fifth mirror 23e reflects the beam having a wavelength of $\lambda 4$ having been output from the fourth LD 10d and passed through a corresponding one of the collimating lenses 21 so as to guide the beam having a wavelength of $\lambda 4$ to the second mirror 23b.

The beam having a wavelength of $\lambda 1$ output from the first LD 10a passes through a corresponding one of the collimating lenses 21, is sequentially reflected by the first mirror 23a and the third mirror 23c, passes through the optical isolator 22, and then is condensed by the output-side lens 24 in the transmitter-side optical system 12 so as to be output to the transmitter-side optical receptacle 8. The beam having a wavelength of λ2 output from the second LD 10b passes through a corresponding one of the collimating lenses 21, is transmitted through the second mirror 23b and the third mirror 23c, passes through the optical isolator 22, and then is condensed by the output-side lens 24 in the transmitter-side optical system 12 so as to be output to the transmitter-side optical receptacle 8. The beam having a wavelength of λ3 output from the third LD 10c passes through a corresponding one of the collimating lenses 21, is sequentially reflected by the fourth mirror 23d and the second mirror 23b, is transmitted through the third mirror 23c, passes through the optical isolator 22, and then is condensed by the output-side lens 24 in the transmitter-side optical system 12 so as to be output to the transmitter-side optical receptacle 8. The beam having a wavelength of λ4 output from the fourth LD 10d passes through a corresponding one of the collimating lenses 21, is reflected by the fifth mirror 23e, is transmitted through the fourth mirror 23d, is reflected by the second mirror 23b, is transmitted through the third mirror 23c, passes through the optical isolator 22, and then is condensed by the output-side lens 24 in the transmitter-side optical system 12 so as to be output to the transmitter-side optical receptacle 8.

The beams having wavelengths of λ1 to λ4 output from the LDs 10a to 10d are combined as described above by the transmitter-side optical system 12 so as to be output from the transmitter-side optical receptacle 8. It should be understood that the specific structure of the transmitter-side optical system 12 is not limited to the above description and can be changed as appropriate.

Figure 5A:
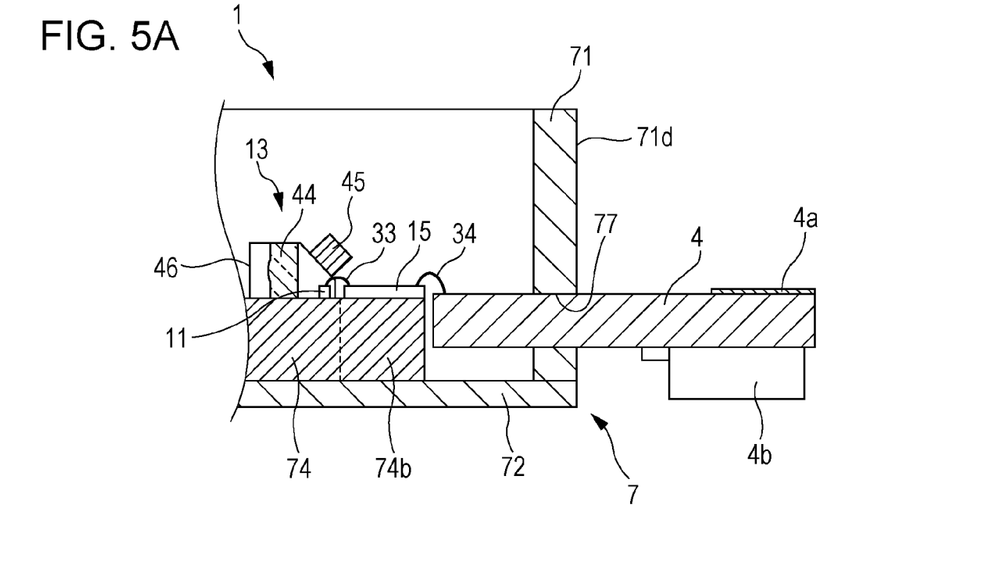
FIG. 5A is an enlarged sectional view of a main portion of the transmitter and receiver integrated optical sub-assembly of FIGS. 3A and 3B.

As illustrated in FIGS. 3A, 3B, and 5A, the plurality of PDs 11 are directly mounted on the metal plate 74, which is secured to the bottom wall 72, and arranged in a row in the width direction. It is noted that the plurality of PDs 11 and the plurality of LDs 10 are not necessarily arranged in a single row. It is sufficient that the plurality of PDs 11 be arranged in a row and the plurality of LDs 10 be arranged in a row. Here, a case where four PDs 11 are provided is described. The TIA 15 that amplifies electrical signals output from the PDs 11 is disposed between four PDs 11 and the fourth side wall 71d. The TIA 15 and the driver IC 14 are arranged such that the positions where the TIA 15 and the driver IC 14 are disposed are substantially the same in the length direction.

According to the present embodiment, the TIA 15 is directly mounted on the metal plate 74. Specifically, a cut 4c is formed at a position of the second circuit board 4 where the TIA 15 is mounted and a projection 74b that projects into the cut 4c is formed in the metal plate 74, and the TIA 15 is mounted on the projection 74b. Thus, the heat dissipation capability is improved by mounting the TIA 15 on the metal plate 74 having a larger heat dissipation area and the degradation of the high-speed signals is suppressed by reducing the distance between the PDs 11 and the TIA 15. When neither the degradation of the heat dissipation capability nor the degradation of the high-speed signals causes a problem, the TIA 15 may be mounted on the second circuit board 4.

The PDs 11 and the TIA 15 are electrically connected to one another through wiring 33. The TIA 15 and the wiring pattern of the second circuit board 4 are electrically connected to each other through wiring 34. Here, the PDs 11 have light receiving portions on their top surfaces.

The TIA 15 preferably includes alternating current (AC) output terminals (not illustrated) that extract and output only AC components, that is, signal components, from electrical signals having been input from the PDs 11 and direct current (DC) output terminals (not illustrated) that extract and output only DC components, that is, background components, from electrical signals having been input from the PDs 11. The AC output terminals are electrically connected to the second electrical connection terminals 4a through the wiring pattern formed on the second circuit board 4 and electrically connected to the first circuit board 2 through the first FPC 5. The DC output terminals are electrically connected to the second electrical connector 4b through the wiring pattern formed on the second circuit board 4 and electrically connected to the first circuit board 2 through the second FPC 6.

The receiver-side optical system 13 is disposed between the receiver-side optical receptacle 9 and four PDs 11 on the bottom wall 72 (here, on the metal plate 74) and splits the optical signal incident thereupon from the receiver-side optical receptacle 9 so as to output resulting optical signals to four PDs 11.

Figure 5B:
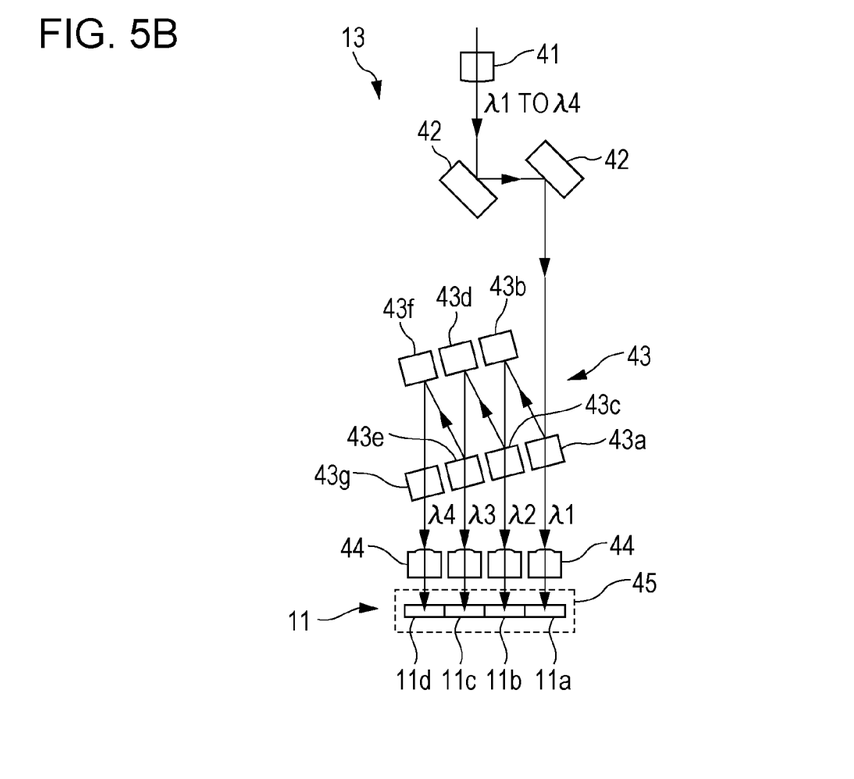
FIG. 5B illustrates the structure of a receiver-side optical system.

As illustrated in FIG. 5B, the receiver-side optical system 13 includes a collimating lens 41, a pair of optical path conversion mirrors 42, an optical splitter 43, four condensing lenses 44, and a light-reception-side mirror 45. The collimating lens 41 collimates light incident thereupon from the receiver-side optical receptacle 9. The optical path conversion mirrors 42 translate the light incident thereupon from the collimating lens 41 in the width direction. The optical splitter 43 includes seven mirrors (filters) 43a to 43g, splits the light incident thereupon from the optical path conversion mirrors 42 into light beams having different wavelengths, and outputs the split beams. The condensing lenses 44 condense the beams having respective wavelengths incident thereupon from the optical splitter 43. The light-reception-side mirror 45 reflects downward in the height direction the beams incident thereupon from the condensing lenses 44 so as to guide the beams to the light receiving portions of the respective PDs 11. The light-reception-side mirror 45 is secured to the metal plate 74 with a support member 46 interposed therebetween.

Hereafter, a case is described in which light including beams having wavelengths of λ1 to λ4 are incident from the receiver-side optical receptacle 9, and the beams having wavelengths of λ1, λ2, λ3, and λ4 are respectively received by a first PD 11a, a second PD 11b, a third PD 11c, and a fourth PD 11d.

The optical splitter 43 includes the following first to seventh mirrors 43a to 43g: the first mirror 43a that transmits the beam having a wavelength of λ1 and reflects the beams having wavelengths of λ2 to λ4 among the beams of light incident thereupon from the optical path conversion mirrors 42; the second mirror 43b that reflects the beams of all the wavelengths incident thereupon from the first mirror 43a; the third mirror 43c that transmits the beam having a wavelength of λ2 and reflects the beams having wavelengths of λ3 and λ4 among the beams incident thereupon from the second mirror 43b; the fourth mirror 43d that reflects the beams of all the wavelengths incident thereupon from the third mirror 43c; the fifth mirror 43e that transmits the beam having a wavelength of λ3 and reflects the beams having wavelength of λ4 among the beams incident thereupon from the fourth mirror 43d; the sixth mirror 43f that reflects the beams of all the wavelengths incident thereupon from the fifth mirror 43e; and the seventh mirror 43g that transmits the beam having a wavelength of λ4 among the beams incident thereupon from the sixth mirror 43f.

The beam having a wavelength of λ1 having been transmitted through the first mirror 43a is condensed by a corresponding one of the condensing lenses 44, reflected by the light-reception-side mirror 45, and then received by the first PD 11a. The beam having a wavelength of λ2 having been transmitted through the third mirror 43c is condensed by a corresponding one of the condensing lenses 44, reflected by the light-reception-side mirror 45, and then received by the second PD 11b. The beam having a wavelength of λ3 having been transmitted through the fifth mirror 43e is condensed by a corresponding one of the condensing lenses 44, reflected by the light-reception-side mirror 45, and then received by the third PD 11c. The beam having a wavelength of λ4 having been transmitted through the seventh mirror 43g is condensed by a corresponding one of the condensing lenses 44, reflected by the light-reception-side mirror 45, and then received by the fourth PD 11d.

As described above, with the receiver-side optical system 13, the light incident upon the receiver-side optical system 13 from the receiver-side optical receptacle 9 is split, and the split beams of wavelengths λ1 to λ4 are respectively incident upon the PDs 11a to 11d. The specific structure of the receiver-side optical system 13 is not limited to the above description and can be changed as appropriate.

Next, an assembly process of the optical module 100 is described.

In order to assemble the optical module 100, the second circuit board 4 of the transmitter and receiver integrated optical sub-assembly 1 and the first circuit board 2 are initially connected to each other through the second FPC 6, alignment work is performed so as to align the LDs 10 and the transmitter-side optical system 12 with one another and align the PDs 11 and the receiver-side optical system 13 with one another, and checking work is performed so as to check whether or not the LDs 10, the PDs 11, the driver IC 14, and the TIA 15 are normally operated.

In the alignment work to align the LDs 10 with the transmitter-side optical system 12, positions of the collimating lenses 21 and so forth are adjusted so as to maximize the intensity of light output to the transmitter-side optical receptacle 8 while applying voltage directly to the LDs 10 through the second FPC 6 or causing the LDs 10 to emit light by operating the driver IC 14 with the power source signals supplied through the second FPC 6.

In the alignment work to align the PDs 11 with the receiver-side optical system 13, the positions and so forth of the condensing lenses 44 are adjusted so as to maximize the intensity of light received by the PDs 11, that is, so as to maximize voltages of the DC components output from the DC output terminals of the TIA 15 while inputting the light from the receiver-side optical receptacle 9 and operating the PDs 11 and the TIA 15 with the power source signals supplied through the second FPC 6.

In the case where desired characteristics are not obtained by the alignment work or a problem is found during the checking work, the transmitter and receiver integrated optical sub-assembly 1 is detached from the second FPC 6 so as to be replaced with a new transmitter and receiver integrated optical sub-assembly 1 or an element found to be a cause of the problem is replaced. At this time, the transmitter and receiver integrated optical sub-assembly 1, which is connected to the first circuit board 2 through a connector, that is, through the second FPC 6, can be easily detached.

When no problem is found during the alignment work and the checking work, the first FPC 5 is connected to both the circuit boards 2 and 4 by soldering, and checking work is performed while high-speed signals (here, 25 Gb/s high-speed electrical signals) are transmitted through the first FPC 5. When no problem is found by this checking work, the transmitter and receiver integrated optical sub-assembly 1 and the first circuit board 2 are housed in the casing 3. Thus, the optical module 100 is obtained.

Operations and Effects of the Embodiment

As has been described, in the optical module 100 according to the present embodiment, signals are transmitted between both the circuit boards 2 and 4 as follows: the high-speed electrical signals of 1 GHz or higher are transmitted through the first FPC 5 connected to both the circuit boards 2 and 4 by soldering; and the power source signals and the low-speed electrical signals of 1 MHz or lower including the DC signals are transmitted through the second FPC 6 connected to both the circuit boards 2 and 4 through the connectors.

Thus, the alignment work and the checking work of the transmitter and receiver integrated optical sub-assembly 1 can be performed with both the circuit boards 2 and 4 connected to each other through the connectors using the second FPC 6. Accordingly, when a problem occurs during the alignment work or the checking work, the transmitter and receiver integrated optical sub-assembly 1 can be easily detached. That is, according to the present embodiment, the optical module 100 that facilitates the assembly process including the checking work and the alignment work can be realized.

Furthermore, according to the present embodiment, the high-speed signals are transmitted through the first FPC 5 that is connected to both the circuit boards 2 and 4 by soldering and includes the impedance lines for high-speed transmission. This suppresses losses and crosstalk at a connecting portion between both the circuit boards 2 and 4. Thus, the optical module 100 suitable for high-speed transmission can be realized.

Furthermore, the first FPC 5 for the high-speed electrical signals and the second FPC 6 for low-speed electrical signals including the power source signals are separately provided. This allows the first and second FPCs 5 and 6 to be formed of different materials and have different structures. Thus, the cost can be reduced by using, for example, a low-cost FPC as the second FPC 6.

Furthermore, the optical module 100 includes the transmitter and receiver integrated optical sub-assembly 1 as the optical sub-assembly. The transmitter and receiver integrated optical sub-assembly 1 includes the LDs 10, the driver IC 14, the PDs 11, and the TIA 15 housed in the housing 7, and in the transmitter and receiver integrated optical sub-assembly 1, the second electrical connection terminals 4a are electrically connected to the driver IC 14 and the TIA 15 through the wiring pattern formed on the second circuit board 4 and the second electrical connector 4b is electrically connected to the driver IC 14 and the TIA 15 through the wiring pattern formed on the second circuit board 4.

When the optical sub-assembly includes a transmitter optical sub-assembly (TOSA) and a receiver optical sub-assembly (ROSA), the TOSA and the ROSA are provided with their respective circuit boards. Each of these circuit boards needs to be connected to the first circuit board 2 through its own FPCs 5 and 6. Thus, at least two pairs of the FPCs 5 and 6 are needed. In contrast, the transmitter and receiver integrated optical sub-assembly 1 is used as the optical sub-assembly according to the present embodiment. This allows the transmitter and receiver integrated optical sub-assembly 1 to be connected to the first circuit board 2 through a single pair of the FPCs 5 and 6. Thus, the cost can be reduced by reducing the number of components and the assembly process can be further facilitated. Furthermore, compared to the case where two pairs of the FPCs 5 and 6 are used, a wiring space can be increased in the case where a single pair of the FPCs 5 and 6 are used. Thus, more wires can be routed.

Furthermore, according to the present embodiment, the LDs 10, the PDs 11, the transmitter-side optical system 12, the receiver-side optical system 13, the driver IC 14, and the TIA 15 are disposed in the housing 7 of the transmitter and receiver integrated optical sub-assembly 1. That is, according to the present embodiment, a transmission unit and a reception unit are housed in a single common housing 7.

Thus, compared to a case such as a related-art case where the TOSA serving as the transmission unit and the ROSA serving as the reception unit include their respective housings, the size of the transmitter and receiver integrated optical sub-assembly 1 can be reduced. Since the thickness of the housing 7 is, for example, about 0.8 mm, the width can be reduced at least by about 1.6 mm according to the present embodiment compared to the related art. This can significantly reduce the area occupied by the transmitter and receiver integrated optical sub-assembly 1 in the casing 3. The width of an inner space of the casing 3 is, for example, about 16 mm at the maximum. Accordingly, when the width of the transmitter and receiver integrated optical sub-assembly 1 can be reduced by 1 mm or more, this produces a significant effect.

Furthermore, according to the present embodiment, the driver IC 14 and the TIA 15 are housed in the housing 7 of the transmitter and receiver integrated optical sub-assembly 1. Thus, the driver IC 14 can be disposed in close proximity to the LDs 10 and the TIA 15 can be disposed in close proximity to and the PDs 11. As a result, the length of wiring between the LDs 10 and the driver IC 14 and the length of wiring between the PDs 11 and the TIA 15 can be reduced. This is suitable for high-speed transmission because degradation of the high-speed signals can be suppressed.

Furthermore, since both the transmission unit and the reception unit are housed in a single common housing 7, the area of the housing 7 is increased compared to the related-art structure in which the TOSA and the ROSA include their respective housings. Thus, the heat dissipation area can be increased, and accordingly, the heat dissipation capability can be improved.

Furthermore, in the case where the TOSA and the ROSA are separately provided as in the related art, the TOSA and the ROSA are provided with their respective circuit boards. This leads to formation of a gap between both the circuit boards which may become a dead space. In contrast, the driver IC 14 and the TIA 15 are connected to a common circuit board, that is, the second circuit board 4 according to the present embodiment. Thus, the wiring space can be reliably increased compared to that of the related art, and more wiring can be formed. Furthermore, wiring and the like of, for example, the power sources of the driver IC 14 and the TIA 15 can be shared. Thus, the wiring space can be reliably increased.

Furthermore, the LDs 10, the PDs 11, the transmitter-side optical system 12, and the receiver-side optical system 13 are mounted on the metal plate 74 secured to the bottom wall 72 in the transmitter and receiver integrated optical sub-assembly 1.

With this structure, the heat dissipation capability can be improved when the housing 7 is formed of a material having a low heat conductivity such as resin. Furthermore, an assembly process is possible in which the metal plate 74 can be housed in the housing 7 after the LDs 10, the PDs 11, the transmitter-side optical system 12, and the receiver-side optical system 13 have been mounted on the metal plate 74. Thus, the assembly process can be facilitated compared to the case where the LDs 10, the PDs 11, the transmitter-side optical system 12, and the receiver-side optical system 13 are directly mounted in the housing 7. Furthermore, relative height positions of the transmitter-side optical system 12 and the transmitter-side optical receptacle 8 and the relative height positions of the receiver-side optical system 13 and the receiver-side optical receptacle 9 can be adjusted by changing the thickness of the metal plate 74.

Furthermore, the driver IC 14 is mounted on the second circuit board 4 and the LDs 10 are mounted on the bottom wall 72 (metal plate 74) in the transmitter and receiver integrated optical sub-assembly 1. Thus, transmission of heat generated in the driver IC 14 to the LDs 10 is suppressed. This can suppress the occurrences of problems such as reduction in luminous efficiency of the LDs 10 due to the effect of heat generated in the driver IC 14.

Summarization of the Embodiment

Next, a technical concept that is understood from the above-described embodiment is described with reference signs and the like used in the embodiment. In should be noted that the reference signs and the like in the following description do not limit elements of the claims to the members or the like specifically described in the embodiment.

[1] An optical module (100) includes a first circuit board (2), at least one first electrical connection terminal (2c), a first electrical connector (2d), an optical sub-assembly (1), at least one second electrical connection terminal (4a), a second electrical connector (4b), a first flexible printed circuit (5), and a second flexible printed circuit (6). The first circuit board is electrically connected to a communication device. The at least one first electrical connection terminal (2c) is formed on a front surface of the first circuit board (2) at one end portion of the first circuit board (2). The first electrical connector (2d) is mounted on a rear surface of the first circuit board (2) at the one end portion of the first circuit board (2). The optical sub-assembly (1) includes a housing (7) and a second circuit board (4). An optical system and an optical element for transmission of an optical signal, an optical system and an optical element for reception of an optical signal, or the optical system and the optical element for the transmission of the optical signal and the optical system and the optical element for the reception of the optical signal are housed in the housing (7). The second circuit board (4) has one end portion inserted into the housing (7) and another end portion disposed outside the housing (7). The at least one second electrical connection terminal (4a) is formed on a front surface of the second circuit board (4) at the other end portion of the second circuit board (4). The second electrical connector (4b) is formed on a rear surface of the second circuit board (4) at the other end portion of the second circuit board (4). The first flexible printed circuit (5) includes at least one third electrical connection terminal (5a), at least one fourth electrical connection terminal (5b), and at least one impedance line for high-speed transmission. The at least one third electrical connection terminal (5a) is connected to the at least one first electrical connection terminal (2c) by soldering. The at least one fourth electrical connection terminal (5b) is connected to the at least one second electrical connection terminal (4a) by soldering. The at least one third electrical connection terminal (5a) and the at least one fourth electrical connection terminal (5b) are electrically connected to each other through the at least one impedance line for high-speed transmission. The second flexible printed circuit (6) includes a third electrical connector (6a), a fourth electrical connector (6b), and transmission lines. The third electrical connector (6a) is connected to the first electrical connector (2d). The fourth electrical connector (6b) is connected to the second electrical connector (4b). The third electrical connector (6a) and the fourth electrical connector (6b) are connected to each other through the transmission lines. In the optical module (100), a high-speed electrical signal of 1 GHz or higher is transmitted between the first circuit board (2) and the second circuit board (4) through the first flexible printed circuit (5), and a power source signal and a low-speed electrical signal of 1 MHz or lower including a direct-current signal are transmitted between the first circuit board (2) and the second circuit board (4) through the second flexible printed circuit (6).

[2] In the optical module (100) described in [1], the at least one impedance line includes a microstrip line, a grounded coplanar line, or a strip line.

[3] In the optical module (100) described in [1] or [2], the optical sub-assembly includes in the housing (7) a light emitting element (10), a driver integrated circuit (14) that drives the light emitting element (10), a light receiving element (11), and an amplifying integrated circuit (15) that amplifies an electrical signal from the light receiving element (11). In the optical module (100), the at least one second electrical connection terminal (4a) includes a plurality of second electrical connection terminals (4a). In the optical module (100), the plurality of second electrical connection terminals (4a) and the second electrical connector (4b) are electrically connected to the driver integrated circuit (14) and the amplifying integrated circuit (15) through a wiring pattern formed on the second circuit board (4).

Although the embodiment of the present invention has been described, the above-described embodiment does not limit the invention which falls within the scope of the claims. Furthermore, it should be noted that not all of the combinations of the features described in the embodiment are necessarily required for means for solving the task of the invention.

The present invention can be modified as appropriate without departing from the gist of the present invention.

For example, although the housing 7 has a rectangular parallelepiped shape according to the above-described embodiment, this does not limit the shape of the housing 7. The housing 7 may have, for example, a polygonal or circular shape in top view.

Although it is not described in the above-described embodiment, a metal plate as a shield may be disposed between the transmission unit (the driver IC 14, the LDs 10, and the transmitter-side optical system 12) and the reception unit (the TIA 15, the PDs 11, and the receiver-side optical system 13) so as to suppress crosstalk between the transmission unit and the reception unit. The crosstalk between the transmission unit and the reception unit is likely to occur between the wiring connecting the driver IC 14 to the LDs 10 and the wiring connecting the TIA 15 to the PDs 11. Thus, by disposing the metal plate at least between the former wiring and the latter wiring, the crosstalk between the transmission unit and the reception unit can be suppressed.

What is claimed is:

1. An optical module comprising:
    a first circuit board electrically connected to a communication device;
    at least one first electrical connection terminal formed on a front surface of the first circuit board at one end portion of the first circuit board;
    a first electrical connector mounted on a rear surface of the first circuit board at the one end portion of the first circuit board;
    an optical sub-assembly that includes
        a housing in which an optical system and an optical element for transmission of an optical signal, an optical system and an optical element for reception of an optical signal, or, the optical system and the optical element for the transmission of the optical signal and the optical system and the optical element for the reception of the optical signal are housed, and
        a second circuit board that has one end portion inserted into the housing and that has another end portion disposed outside the housing;
    at least one second electrical connection terminal formed on a front surface of the second circuit board at the other end portion of the second circuit board;
    a second electrical connector formed on a rear surface of the second circuit board at the other end portion of the second circuit board;
    a first flexible printed circuit that includes
        at least one third electrical connection terminal connected to the at least one first electrical connection terminal by soldering,
        at least one fourth electrical connection terminal connected to the at least one second electrical connection terminal by soldering, and
        at least one impedance line for high-speed transmission through which the at least one third electrical connection terminal and the at least one fourth electrical connection terminal are electrically connected to each other; and
    a second flexible printed circuit that includes
        a third electrical connector connected to the first electrical connector,
        a fourth electrical connector connected to the second electrical connector, and
        transmission lines through which the third electrical connector and the fourth electrical connector are connected to each other,
    wherein a high-speed electrical signal of 1 GHz or higher is transmitted between the first circuit board and the second circuit board through the first flexible printed circuit, and a power source signal and a low-speed electrical signal of 1 MHz or lower including a direct-current signal are transmitted between the first circuit board and the second circuit board through the second flexible printed circuit.

2. The optical module according to claim 1,
    wherein the at least one impedance line includes a microstrip line, a grounded coplanar line, or a strip line.

3. The optical module according to claim 1,
    wherein the optical sub-assembly includes in the housing
        a light emitting element,
        a driver integrated circuit that drives the light emitting element,
        a light receiving element, and
        an amplifying integrated circuit that amplifies an electrical signal from the light receiving element, and
    wherein the at least one second electrical connection terminal includes a plurality of second electrical connection terminals, and
    wherein the plurality of second electrical connection terminals and the second electrical connector are electrically connected to the driver integrated circuit and the amplifying integrated circuit through a wiring pattern formed on the second circuit board.

* * * * *